United States Patent [19]

Kim et al.

[11] 4,007,256
[45] Feb. 8, 1977

[54] CATALYTIC PRODUCTION OF HYDROGEN PEROXIDE FROM ITS ELEMENTS

[75] Inventors: Leo Kim; Galeen W. Schoenthal, both of Houston, Tex.

[73] Assignee: Shell Oil Company, Houston, Tex.

[22] Filed: Aug. 5, 1976

[21] Appl. No.: 712,112

Related U.S. Application Data

[63] Continuation-in-part of Ser. No. 567,226, April 11, 1975, abandoned.

[52] U.S. Cl. .......................... 423/584; 260/515 P; 260/586 P; 260/621 G; 260/631 R
[51] Int. Cl.$^2$ ......................................... C01B 15/02
[58] Field of Search ............... 423/584; 260/586 P, 260/621 G, 515 P, 631 R

[56] References Cited

UNITED STATES PATENTS 3,361,533  1/1968  Hooper .............................. 423/584

*Primary Examiner*—O. R. Vertiz
*Assistant Examiner*—Wayne A. Langel

[57] ABSTRACT

Hydrogen peroxide is produced by contacting hydrogen and oxygen with a supported catalyst in the presence of water, an organic nitrogen containing compound and a strong acid. The hydrogen peroxide so produced can be used in processes for the oxidation of organic materials.

21 Claims, No Drawings

CATALYTIC PRODUCTION OF HYDROGEN PEROXIDE FROM ITS ELEMENTS

This application is a continuation-in-part of application Ser. No. 567,226, filed Apr. 11, 1975, now abandoned.

FIELD OF THE INVENTION

This invention relates to the catalytic production of hydrogen peroxide from its elements and to processes of oxidation using hydrogen peroxide.

BACKGROUND OF THE INVENTION

Hydrogen peroxide is typically prepared for industrial use by electrolytic formation, hydrolysis of the peroxodisulfate ion, oxidation of isopropyl alcohol, or by continuous auto-oxidation of anthraquinol.

The possibility of synthesis of hydrogen peroxide by direct synthesis from the elements has been the subject of extensive research for some time, but the synthesis by known processes has not been sufficiently efficient.

One of the earliest patent references to the synthesis of hydrogen peroxide from the elements is that of Henkel et al in U.S. Pat. No. 1,108,752, issued Aug. 25, 1914. Henkel et al discloses the use of a porous clay pipe impregnated with palladium as the catalytic agent to convert hydrogen and oxygen to hydrogen peroxide in the presence of water.

More recent improvements are disclosed by Campbell in British Pat. No. 1,194,804, issued Dec. 13, 1967 and by Hooper in U.S. Pat. No. 3,361,533, issued Jan. 2, 1968. The Campell reference discloses a process for producing hydrogen peroxide by contacting hydrogen and oxygen with certain solid catalysts in the presence of water and a compound which is a reduced form of quinone. The Hooper reference contacts hydrogen and oxygen with certain solid catalysts in the liquid phase in the presence of water, an acid and a non-acidic oxygen-containing organic compound. Both of the above-mentioned processes give relatively low yields of hydrogen peroxide.

BRIEF SUMMARY OF THE INVENTION

Hydrogen peroxide is produced in high quantities by contacting hydrogen and oxygen with a supported palladium catalyst in the presence of water, an organic nitrogen-containing compound and a strong acid.

DETAILED DESCRIPTION OF THE INVENTION

When oxygen and hydrogen are contacted with a supported palladium catalyst in the presence of water, a strong acid and a nitrogen-containing organic compound, enhanced yields of hydrogen peroxide are obtained.

The catalyst is palladium, either alone or alloyed or mixed with a minor proportion of one or more other metals, such as gold or platinum, supported on a solid catalyst carrier or support. The support is selected from a large number of conventional catalyst supports of natural or synthetic origin. Useful supports are microporous, solid materials having surface areas greater than 1 square meter per gram. Very suitable supports are selected from the group consisting of siliceous materials, aluminus materials, acid-type ion exchange resins, mixed acid-base ion exchange resins and basic-type ion exchange resins. Specific examples of suitable supports are the aluminum oxides in its various forms such as alpha and gamma, silica, silica-alumina, titania, zirconia, beryllia, magnesia and other oxide ceramics, silicon carbide, porous agglomerates comprising silicon and/or silicon carbide, selected clays, artificial and natural zeolites, charcoal, pumice, ion exchange resins made from polystyrene resins, vinyl addition polymers, phenolic resins, polyethylene-styrene graft copolymers and the like. Typically, the catalyst is prepared by dissolving a palladium compound such as palladium chloride ($PdCl_2$) or palladium nitrate ($Pd(NO_3)_2$) in the minimum amount of an acid such as hydrochloric, nitric or aqua regia, absorbing the solution on this porous support surface, evaporating to dryness and reducing the palladium salts to the metal by means of hydrogen at a suitable temperature, for example, from about 50° to about 400° C.

The invention is carried out in the presence of a strong acid. The pKa of this acid is less than about 5, preferably less than about 3. Preferably the acidity (that is, the hydrogen ion-concentration) of the reaction mixture is at least $10^{-5}$N. Typical suitable acids are sulfuric acid, nitric acid, hydrofluoric acid, hydrochloric acid, hydrobromic acid, phosphoric acid and sulfonic acids or mixtures thereof. Hydrochloric, sulfuric and sulfonic acids give particularly favorable results. The acid can be provided in various forms. For example, it may be employed as an aqueous solution of a mineral acid such as hydrochloric and sulfuric acids, or it may be provided in the form of a sulfonic or phosphonic acid moiety combined with a hydrocarbyl moiety, which hydrocarbyl moiety could also be attached to a nitrogen atom, such nitrogen containing hydrocarbyl being critical to this invention. Alternatively the acid moiety may be attached to the solid catalyst support as for example, ion exchange resins containing fixed ionic groups such as sulfonic and phosphonic acid groups. Typical ion exchange resins of these types can be found in the book "Ion Exchange" by F. Helfferich, McGraw-Hill, 1962. Acid concentrations range from about 0.001 to about 2 equivalents per liter of liquid reaction mixture, preferably from about 0.01 to about 0.1 equivalents per liter of liquid reaction mixture.

It is critical to the process of this invention that it be carried out in the presence of an organic-containing compound. The organic nitrogen-containing compound is preferably otherwise hydrocarbyl and is acyclic, cyclic or polycyclic. The term hydrocarbyl is used herein in its accepted meaning as representing a radical formed from a hydrocarbon by removal of one or more hydrogen atoms. A hydrocarbyl radical contains only hydrogen and carbon. The widest variation is possible in that the hydrocarbyl group may be alkyl, alkenyl, cycloalkyl, cycloalkenyl, aryl, aralkyl, single ring, multi-ring, straight chain, branched chain, large or small. Representative hydrocarbyl groups include methyl, ethyl, methallyl, n-butyl, hexyl, hexenyl, isooctyl, dodecyl, oleyl, octadecyl, eicosyl, hexacosyl, octacosyl, triacontyl, hexatriactonyl, tetracontyl, cyclohexyl, cyclooctyl, cyclooctenyl, phenyl, naphthyl, benzyl, styryl, phenethyl, and the like. (While acetylenic hydrocarbyl groups will work they are not favored because the acetylenic linkage is susceptible to oxidative attack and therefore interfers with the hydrogen peroxide production.) A nitrogen containing hydrocarbyl compound is therefore a compound containing only carbon, hydrogen and nitrogen. The nitrogen-containing hydrocarbyl compound contains from 2 to about 40 carbon atoms, preferably from 2 to about 30 and more preferably from two to about 20 carbon atoms per molecule.

These compounds also contain from 1 to about 4, preferably from 1 to about 3 and more preferably from 1 to about 2 nitrogen atoms per molecule. Compounds containing one nitrogen atom per molecule are very suitable. When the nitrogen-containing hydrocarbyl compounds are polycyclic they contain from 1 to about 4, preferably from 1 to about 3 and more preferably from 1 to about 2 rings per molecule. Among the acyclic nitrogen containing compounds, the nitriles have been found to be particularly suitable. These nitriles are branched or straight chain and contain at least 2 carbon atoms. Suitable examples are acetonitrile, propionitrile, butyronitrile, isobutyronitrile, and particularly suitable is acetonitrile. Suitable compounds from the cyclic and polycyclic materials are ring compounds containing at least one nitrogen in the ring with compounds of more than one ring nitrogen also being suitable. Typical ring compounds are substituted or unsubstituted azirines, azetes, pyrroles, imidazoles, pyrrazoles, pyrrotriazoles, pyridines pyrazines pyrimidines, pyridazines, pyrazolines, pyrrolizines, indolizines, indoles, purines, quinolines and the like as well as correspondingly more saturated members of the above rings. The proportion of nitrogen-containing organic compound in the liquid reaction mixture of this invention is desirably between about 0.1 and about 99.9 percent by volume, preferably between 50 and about 95 percent by volume. Very suitable organic nitrogen-containing compounds are those selected from the group consisting of acetonitrile, pyridine, imidazole, 2,6-dimethyl pyridine, methylpyrrole, 4-cyanopyridine and mixtures of these compounds.

These nitrogen-containing organic compounds are preferably used in solution in the aqueous medium, and in order to enhance solubility more than one of these may be present if desired. The preferable limits of water present in the liquid reaction mixture of this invention ranges from about 0.1 to about 99.9 percent of volume, more preferably from about 1 to about 99 percent by volume and most preferably from about 5 to about 25 percent by volume. If, however, the solubility of a particular compound is low, then that compound is preferably used in the emulsified state, the solid state, or as a nitrogen-containing moiety attached to, i.e., chemically bonded to or associated with, the solid support, preferably to an ion exchange resin support. Preferable nitrogen-containing moieties are those selected from the group consisting of nitriles, amides and amines.

The pressure at which the above process is carried out is not critical and is usually atmospheric or superatmospheric, up to for example 1000 atmospheres, although the upper limitation is determined primarily by cost limitations rather than inherent process limitation. Thus, the desirable pressure range is from about 1 to about 1000 atmospheres. The ratio of partial pressure of oxygen to hydrogen typically ranges from about 0.25:1 to about 2:1, and preferably about 0.5:1 to about 1:1. The oxygen and/or hydrogen is supplied in pure form or diluted with gas that is inert to the condition of the process. Argon and nitrogen are good diluents, and the oxygen may be supplied as air. It may be desirable to use diluted oxygen for safety reasons, but with adequate precautions dilution is not necessary.

A particular application of this invention is to provide a process of oxidation which comprises contacting an oxidizable substance in the liquid phase with hydrogen peroxide produced in situ by contacting oxygen and hydrogen with a supported palladium catalyst in the presence of water, a strong acid and a nitrogen-containing organic compound.

While it is possible to separately prepare the hydrogen peroxide solution and then combine it with an oxidizable substance, either in liquid phase, or by dissolving in the hydrogen peroxide solution, it is preferable to contact the oxidizable substance with this hydrogen peroxide formed by the reaction of hydrogen with oxygen as soon as possible after the hydrogen peroxide has been formed, or more preferably, by contacting the oxidizable substance with the hydrogen peroxide in the same reaction vessel in which the hydrogen peroxide is being formed. Thus, a preferred form of this process comprises passing hydrogen and oxygen through an aqueous solution of the oxidizable substance in the presence of a supported palladium catalyst in the presence of a strong acid and a nitrogen-containing organic compound. Alternatively, where the oxidizable substance has only a limited solubility in the aqueous phase, a suspension or emulsion is used, or a co-solvent is added for mutual solubility.

Optionally, the process is carried out in the presence of a catalyst that promotes the reaction between hydrogen peroxide and the oxidizable substance. It is thought that these promoters operate by causing the hydrogen peroxide to decompose into reactive radicals or other intermediate species which then react with the oxidizable substances. The decomposition of the hydrogen peroxide may be promoted by chemical means as for example by compounds which can enter into an electron transfer reaction with the hydrogen peroxide, or by radiation such as ultraviolet light, X-ray and gamma rays. Typical of the chemical promoters are salts, nickel, cobalt, cerium, manganese, vanadium, tin and the like. Iron and cobalt are conventionally used.

The nature and concentration of the supported palladium catalyst, the strong acid and the nitrogen-containing compound for the process of oxidation are the same as have been defined above for the hydrogen peroxide production process. The process of oxidation is applicable to organic and inorganic substances.

Examples of oxidizable inorganic substances are, for example, sulfonic acids such as chlorosulfonic acid which is oxidizable to a mixture of the per-sulfuric acids, permonosulfuric acid $H_2SO_5$ (Caros acid) and per-disulfuric $H_2S_2O_8$. A further example is the oxidation of sulfide ions in aqueous systems. This oxidation process is useful, for example, for removing hydrogen sulfide from potable water by converting the sulfide ion to solid sulfur which can be either filtered or settled out.

Examples of oxidizable organic substances include, for example, aliphatic hydrocarbons such as cyclohexane (to give cyclohexanol and cyclohexanone), aromatic hydrocarbons such as benzene (to give phenol), m-toluic acid (to give isothalic acid), and amines (to give amine oxides).

In one method of carrying out the oxidation process, the oxidizable substance, the supported palladium catalyst, the strong acid and the nitrogen-containing organic compound are vigorously agitated together in an aqueous solution in the presence of hydrogen and oxygen. The product of the oxidation process is separated from the liquid medium by, for example, distillation or liquid-liquid extraction.

In another method, the aqueous medium containing the oxidizable substance, the strong acid, and the nitrogen-containing organic compound is passed over a bed of supported palladium catalyst counter-current to a gaseous stream containing hydrogen and oxygen. Alternatively, the strong acid may be incorporated into the catalyst support.

In a particular embodiment this invention provides a process for producing phenol from benzene by contacting the benzene with hydrogen and oxygen in the presence of a supported palladium catalyst in the presence of water, a strong acid, an organic nitrogen-containing component and a compound which promotes the decomposition of hydrogen peroxide. A preferred hydrogen peroxide decomposition promoter for this application is di-iron dipyridylpyridazine.

In oxidizing m-xylene to isophthalic acid the most difficult and rate determining step is the oxidation of the intermediate n-toluic acid to isophthalic acid. The process of this invention facilitates this oxidation. In particular, good results are achieved when m-toluic acid is contacted with hydrogen and oxygen in the presence of a supported palladium catalyst in the presence of water, a strong acid, an organic nitrogen-containing compound and a compound which promotes the decomposition of hydrogen peroxide. A preferred hydrogen peroxide decomposition promoter for this oxidation is cobaltous chloride.

This invention further provides a useful process for the oxidation of cyclohexane to cyclohexanol and cyclohexanone by contacting the cyclohexane with hydrogen and oxygen in the presence of a supported palladium catalyst in the presence of water, a strong acid, an organic nitrogen-containing compound and a compound which promotes the decomposition of hydrogen peroxide. A preferred hydrogen peroxide decomposition promoter for this conversion is cobaltous chloride.

A further particular use of this invention to oxidize amines to amine oxides is illustrated by the oxidation of N,N-dimethyldodecylamine to N,N-dimethyldodecylamine oxide by contacting the N,N-dimethyldodecylamine with hydrogen and oxygen in the presence of a supported palladium catalyst in the presence of water, a strong acid, and an organic nitrogen-containing compound.

The processes of this invention will be further described by the following illustrative embodiments which are provided for illustration and are not to be construed as limiting the invention.

Illustrative Embodiment I

Part A — A supported palladium catalyst as used in the process of the invention was prepared by first taking 8 millimeters (ml) of a 10 percent solution of $Pd(NO_3)_2$, diluting this with water to 100 ml and adding the resulting solution to 100 grams (g) of Davidson D-62 silica gel (manufactured by W.R. Grace, and containing 100 percent $SiO_2$). The impregnated silica gel was dried in a vacuum oven at 120°, then reduced with a 1:2 volume mixture of hydrogen and nitrogen in successive temperature stages of 50°C for one-half hour at each stage from 50°C to a final temperature of 300°C.

To a 100 ml glass reactor equipped with a teflon-coated magnetic stirring bar was added 0.5 g of the above prepared catalyst, 25.5 ml of acetonitrile solution (15 percent vol. $H_2O$/85 percent vol. acetonitrile) and 4.5 ml of a 0.01 N HCl, 0.1 N $H_2SO_4$ acid aqueous solution. The reaction was stirred at 5°C for 60 minutes with 70 pounds per square inch gauge (psig) hydrogen pressure and 70 psig oxygen pressure, recharging with a new gas mix each time 40 psig total gas was consumed. The reactor was always first charged with hydrogen, followed by charging with oxygen. The reactor was always first charged with hydrogen, followed by charging with oxygen. The reaction mixture was analyzed and found to contain 0.71 percent by weight of hydrogen peroxide at a determined selectivity based on hydrogen of 47.3 percent.

Part B — The process of Part A above was repeated in a manner not in accord with this invention by replacing the nitrogen-containing inorganic compound acetonitrile with 25.2 ml of a non-acid oxygen-containing organic compound acetone (to give a 15 percent vol. water/85 percent acetone ratio). The reaction mixture was analyzed and found to contain 0.62 percent by weight of hydrogen peroxide at a determined selectivity based on hydrogen of 20 percent.

Illustrative Embodiment II

Part A — A catalyst as used in this invention comprising a palladium nitrate on acid ion exchange resin was prepared by adding 10 ml of a 0.1 percent solution of $Pd(NO_3)_2$ to 1.0 g of a sulfonic acid ion exchange resin (Ag 50 WX-4 manufactured by Bio-Rad, Richmond, Calif.) Specifications: 200–400 mesh acid form, washing with deionized water and reducing with hydrogen in 50 ml of water at a temperature of 25°C for 20 minutes at 100 psig hydrogen pressure.

To a 100 ml glass reactor equipped with a teflon-coated magnetic stirring bar was added 1 g of the above prepared catalyst, 3-5 ml of water and 25.5 ml of acetonitrile solution (10 percent vol. $H_2O$/90 percent vol. acetonitrile). The reaction was performed at 5°C for 30 minutes with 70 psig hydrogen pressure and 70 psig oxygen pressure, recharging with a new gas mix each time 40 psig total gas pressure was consumed. The reaction mixture was analyzed and found to contain 1.1 percent hydrogen peroxide at a determined selectivity based on hydrogen of 47.9 percent.

Part B — The process of part A of this Illustrative Embodiment was repeated in a manner not in accord with this invention by replacing the acetonitrile solution with an acetone solution (10 percent vol. water/90 percent vol. acetone ratio). The reaction mixture was analyzed and found to contain 0.1 percent by weight of hydrogen peroxide at a determined selectivity based on hydrogen of 4.4 percent.

Illustrative Embodiment III

A process in accord with this invention was carried out in a manner similar to Part A, Illustrative Embodiment II, with the following differences: 20 ml palladium sulfate 0.1 weight percent aqueous solution was added to 9.0 g ion exchange resin (XN 1010, manufactured by Rohn and Haas, Phil. Penn.) Specification: 200 mesh, acid form. A 300-ml tantalum reactor was used, using 8.0 g of the above catalyst, 150 ml of a 90/10 vol. percent acetonitrile/water mixture, 150 psig hydrogen pressure, 150 psig oxygen pressure with a continuous purge of gas (50 percent $O_2$/50 percent $H_2$) rate of 1.7 liters/hr.

For varying reaction times the results in Table 1 was obtained:

TABLE I

HYDROGEN PEROXIDE FROM PD/ION EXCHANGE RESIN-SO₃H FORM/90 PERCENT WT. ACETONITRILE/10 PERCENT WT.ᵃ H₂O

| Time, Hours | Percent Weight Hydrogen Peroxide | Selectivity Based On Hydrogen |
|---|---|---|
| 6½ | 6.4 | 97 |
| 8 | 7.4 | 76 |
| 10½ | 8.6 | 37 |

Illustrative Embodiment IV

A process in accord with this invention was carried out similar to the process of Illustrative Embodiment I, Part A using 0.5 grams of 5 percent wt. Pd-on-SiO₂, 30 ml total of water and/or acetonitrile and 1 ml of 0.01 M hydrochloric acid. The hydrogen pressure was 70 psig, the oxygen pressure was 70 psig, the temperature of reaction was between about 0° and 30°C, and the reaction time was 1 hour. The results of varying the ratio of acetonitrile to water are shown in Table II.

TABLE II

EFFECT OF ACETONITRILE/H₂O RATIO

| Volume Percent Acetonitrile/ Volume Percent H₂O | Wt. Percent Hydrogen Peroxide Produced | Selectivity to Hydrogen Peroxide Based on H₂ (Percent) |
|---|---|---|
| 100/0 | 0.04 | "low" |
| 93/7 | 0.46 | 21.0 |
| 90/10 | 0.64 | 26.7 |
| 85/15 | 0.70 | 26.3 |
| 80/20 | 0.66 | 32.2 |
| 50/50 | 0.4 | 44.4 |
| 0/100 | 0.14 | 10 |

Illustrative Embodiment V

A process similar to that of Illustrative Embodiment I, Part A was carried out using 0.5 g of 5 percent palladium on SiO₂, 30 ml of an 85 percent acetonitrile – 15 percent vol. water solution containing 0.01 M HCl, 140 psig total pressure, a reaction temperature between about 0° and 3° C and a reaction time of 1 hour. The results of varying the ratio of hydrogen to oxygen are shown in Table III.

TABLE III

EFFECT ON H₂/O₂ RATIO

| Volume H₂/O₂ | Wt. Percent Hydrogen Peroxide Produced | Selectivity to Hydrogen Peroxide Based on H₂ (Percent) |
|---|---|---|
| 2.0 | 0.35 | 12.6 |
| 1.0 | 0.70 | 26.3 |
| 0.5 | 0.98 | 44.0 |
| 0.33 | 0.87 | 65.0 |

Illustrative Embodiment VI

A process in accord with this invention was carried out in a manner similar to Part A, Illustrative Embodiment II, using the following ion exchange resins in place of Ag 50 WX-4. Table IV gives the results for these experiments.

TABLE IV

PRODUCTION OF HYDROGEN PEROXIDE USING DIFFERENT ION-EXCHANING RESINS

| Support | Manufactured By | Weight Percent Hydrogen Peroxide | Selectivity to Hydrogen Peroxide |
|---|---|---|---|
| Nafion | Du Pont | 4.1 | 38.6 |
| IR 200 | Rohn & Haas | 3.1 | 46.6 |
| AGMP 50 | Bio-Rad | 1.7 | 62.3 |
| ARC 351 | Diamond Shamrock (Redwood City, Calif.) | 1.6 | 50 |
| Dowex MSC-1H | Dow (Midland, Mich.) | 1.4 | 60 |
| Duolite ES-26 | Diamond Shamrock | 1.4 | 100 |
| Bio-Rex 40 | Bio-Rad | 1.2 | 62 |
| Zeo Karb 225 | Permutit (Poole, England) | 0.81 | 25 |

Illustrative Embodiment VII

A series of experiments in accord with this invention were carried out similar to the process of Illustrative Embodiment II, Part A, with the exception that different nitrogen-containing compounds were substituted for acetonitrile. Acetonitrile was used in the last two experiments because methyl pyrrole and cyanopyridine are not soluble in water, but with the added acetonitrile a one-phase solution is obtained. The results are given in Table IV.

TABLE IV

EFFECT OF VARIOUS NITROGEN-CONTAINING ORGANIC COMPOUNDS ON HYDROGEN PEROXIDE PRODUCTION

| Weight Organic Compound | Wt. $H_2O$ | Weight Acetonitrile | Weight Hydrogen Peroxide Produced | Selectivity To Hydrogen Peroxide Based on $H_2$ (Percent) |
|---|---|---|---|---|
| 70%-pyridine | 30% | — | 0.48% | 47.8 |
| 50%-imidazole | 50% | — | 0.1% | 22.1 |
| 50%-2,6-dimethyl pyridine | 50% | — | 0.2% | 56.3 |
| 3%-methylpyrrole | 10% | 87% | 1.33% | 40.0 |
| 3%-4-cyanopyridine | 10% | 87% | 0.66% | 30.0 |

Illustrative Embodiment VII

A process in accord with this invention for oxidizing benzene to phenol was carried out by adding 1.0 g of Pd/SiO$_2$ catalyst prepared according to the procedure of illustrative Embodiment I, Part A, to a 100 ml glass reactor equipped with a teflon-coated magnetic stirring bar along with 10 to 30 mg di-iron dipyridylpyridazine, 24 ml acetonitrile, 6 ml aqueous acid solution (0.1 N H$_2$SO$_4$ / 0.01 N HCl) and 2.0 ml benzene The reaction was performed at 20°C for 32 minutes with 70 psig H$_2$ and psig O$_2$, recharging with a new gas mix each time 40 psig total gas was consumed (156 psig total gas consumed).

Phenol was a analyzed by gas chromatography and was produced at 95 percent selectivity based on 10 percent benzene conversion and 10 percent conversion of consumed hydrogen.

Illustrative Embodiment VIII

A process in accord with this invention for oxidizing cyclohexane to cyclohexanol and cyclohexanone was carried out by adding 2.0 g of Pd/SiO$_2$ catalyst prepared according to the procedure of Illustrative Embodiment I, Part A, to a 100 ml glass reactor equipped with a tefloncoated magnetic stirring bar along with 20 mg of CoCl$_2$.6 H$_2$O, 24 ml acetonitrile, 6 ml aqueous acid solution ((0.1 N H$_2$SO$_4$ / 0.01 N HCl) and 1.0 ml cyclohexane. The reaction was run for 6 hours at 20°C with 70 psig H$_2$ and 70 psig O$_2$, recharging with a new gas mix each time 40 psig total gas was consumed (395 psig total as uptake).

Gas chromatographic analysis indicated that a mixture of cyclohexanol/cyclohexanone was produced at 62 percent selectivity, 17 percent conversion of cyclohexane and 10 percent selectivity based on hydrogen.

Illustrative Embodiment IX

A process in accord with this invention for oxidizing m-toluic acid to isophthalic acid was carried out by adding 20 g of Pd/SiO$_2$ catalyst prepared according to the procedure of Illustrative Embodiment I, Part A, to a 100 ml glass reactor equipped with a teflon-coated magnetic stirring bar along with 0.02 g of CoCl$_2$.6 H$_2$O, 25 ml acetonitrile, 5 ml aqueous acid solution (0.1 N HNO$_3$ / 0.01 N HCl) and 1.0 g m-toluic acid.

The experiment was performed at 0°–5°C for 209 minutes with 100 psig H$_2$ and 40 psig O$_2$ recharging with fresh gas each time 40 psig total gas was consumed (136 psig total gas uptake).

Analysis 0.36 wt. % H$_2$O$_2$ produced. Solvent was removed by vacuum at 20°C. the solid residue was treated with diazomethane to form methyl esters from organic acids. Gas chromatographic analysis on a 15 ft. Tenax column found 95.56% methyl ester of m-toluic acid and 4.44% dimethyl isophthalic. Production was about 50% selectivity base on m-toluic acid, 5% selectivity based on H$_2$ and 8% conversion.

Illustrative Embodiment X

A process in accord with this invention for oxidizing N,N-dimethyldodecylamine to N,N-dimethyldodecylamine oxide was carried out by adding 1.0 g of Pd/SiO$_2$ catalyst prepared according to the procedure of Illustrative Embodiment II, Part A, to a 100 ml glass reactor equipped with a teflon-coated magnetic stirring bar along with 25 ml acetonitrile, 5 ml aqueous acid solution (0.01 N H$_2$SO$_4$/ 0.01N HCl) and 2.0 ml N,N-dimethyldodecylamine. the reaction was run for 4 hours at 0–5°C (220 psig total gas uptake) using 70 psig H$_2$ and 70 psig O$_2$.

Analysis by i.r. indicated 95 percent selectivity to amine oxide based on amine, 50 percent conversion of amine, 13 percent selectivity based on hydrogen.

We claim as our invention:

1. In the process for the production of hydrogen peroxide by contacting hydrogen and oxygen with a palladium catalyst on a solid support in the presence of water and an acid having a pKa of less than about 5, the improvement which comprises carrying out the process in the presence of a nitrogen-containing hydrocarbyl compound having 2 to 40 inclusive carbon atoms and 1 to 3 inclusive nitrogen atoms per molecule in a concentration of from about 0.1 to about 99.9 percent by volume of the liquid reaction mixture.

2. The process of claim 1 where the pKa of the acid is less than about 3.

3. In the process for the production of hydrogen peroxide by contacting hydrogen and oxygen with a palladium catalyst on a solid support in the presence of water and an acid having a pKa of less than about 5, the improvement which comprises carrying out the process in the presence of a nitrogen-containing hydrocarbyl compound selected from the group consisting of nitriles, acyclic amines, azirines, azetas, pyrroles, imidazoles, pyrazoles, pyrrotriazoles, pyridines, pyrazines, pyrimidines, pyridazines, pyrazolines, pyrrolizines, indolizines, indoles, purines, quinolines and the correspondingly more saturated members of the above rings in a concentration of from about 0.1 to about 99.9 percent by volume of the liquid reaction mixture.

4. The process of claim 3 wherein the organic nitrogen-containing hydrocarbyl compound contains from 2 to 20 inclusive carbon atoms per molecule and from 1 to 3 inclusive nitrogen atoms per molecule and the acid is selected from the group consisting of sulfuric acid, nitric acid, hydrofluoric acid, hydrochloric acid, hydrobromic acid, phosphoric acid, phosphonic and sulfonic acids.

5. In the process for the production of hydrogen peroxide by contacting hydrogen and oxygen with a palladium catalyst on a solid support in the presence of water and an acid having a pKa of less than about 5, the improvement which comprises carrying out the process in the presence of a nitrogen-containing hydrocarbyl compound selected from the group consisting of acetonitrile, pyridine, imidazole, 2,6-dimethylpyridine, methylpyrrole, 4-cyanopyridine, and mixtures of the compounds at a concentration of from about 0.1 to about 99.9 percent by volume of the liquid reaction mixture.

6. In the process for the production of hydrogen peroxide by contacting hydrogen and oxygen with a palladium catalyst on a solid support in the presence of water and an acid having a pKa of less than about 5, the improvement which comprises carrying out the process in the presence of a nitrile having from 2 to 20 inclusive carbon atoms per molecule at a concentration of from about 0.1 to about 99.9 percent by volume of the liquid reaction mixture.

7. the process of claim 6 wherein the nitrile is acetonitrile.

8. The process of claim 7 wherein the concentration of the acetonitrile ranges from about 50 to about 95 percent by volume.

9. The process of claim 8 wherein the acid is selected from the group consisting of hydrochloric acid, sulfuric acid, sulfonic acid ion exchange resins and mixtures thereof.

10. The process of claim 6 wherein the acid is selected from the group consisting of sulfuric acid, nitric acid, hydrofluoric acid, hydrochloric acid, hydrobromic acid, phosphoric acid and phosphonic and sulfonic acids and mixtures thereof.

11. The process of claim 6 wherein the nitrile is selected from the group consisting of acetonitrile, propionitrile, butyronitrile and isobutyronitrile.

12. The process of oxidation which comprises contacting an oxidizable substance in the liquid phase with hydrogen peroxide produced in situ by contacting oxygen and hydrogen with a supported palladium catalyst in the presence of water, a strong acid having a pKa of less than about 5 and a nitrogen-containing hydrocarbyl compound having from 2 to 20 carbon atoms and 1 to 3 inclusive nitogen atoms per molecule at a concentration of from 1 to about 95 percent by volume.

13. The process of claim 12 wherein the oxidizable substance is benzene which is oxidized to phenol, and the reaction is carried out additionally with the presence of a compound which promotes the decomposition of hydrogen peroxide.

14. The process of claim 12 wherein the oxidizable substance is m-toluic acid which is oxidized to isophthalic acid, and the reaction is carried out additionally with the presence of a compound which promotes the decomposition of hydrogen peroxide.

15. The process of claim 12 wherein the oxidizable substance is cyclohexane which is oxidized to cyclohexanol and cyclohexanone, and the reaction is carried out additionally in the presence of a compound which promotes the decomposition of hydrogen peroxide.

16. The process of oxidation which comprises contacting an oxidizable substance in the liquid phase with hydrogen peroxide produced in situ by contacting oxygen and hydrogen with a supported palladium catalyst in the presence of water, a strong acid having a pKa of less than about 3 and a nitrile having from about 2 to 20 inclusive carbon atoms per molecule.

17. The process of claim 16 wherein the acid is selected from the group consisting of hydrochloric acid, sulfuric acid, sulfonic acid ion exchange resin and mixtures thereof and the nitrile is acetonitrile.

18. The process of claim 17 wherein the oxidizable substance is benzene which is oxidized to phenol, and the reaction is carried out additionally with the presence of a compound which promotes the decomposition of hydrogen peroxide.

19. The process of claim 17 wherein the oxidizable substance is m-toluic acid which is oxidized to isophthalic acid, and the reaction is carried out additionally with the presence of a compound which promotes the decomposition of hydrogen peroxide.

20. The process of claim 17 wherein the oxidizable substance is cyclohexane which is oxidized to cyclohexanol and cyclohexanone, and the reaction is carried out additionally in the presence of a compound which promotes the decomposition of hydrogen peroxide.

21. The process of claim 16 wherein the nitrile is selected from the group consisting of acetonitrile, propionitrile, butyronitrile, isobutyronitrile and mixtures thereof.

* * * * *